March 26, 1929.  J. G. HUDSPITH  1,707,162
ABRADING DEVICE
Filed March 22, 1927    2 Sheets-Sheet 1
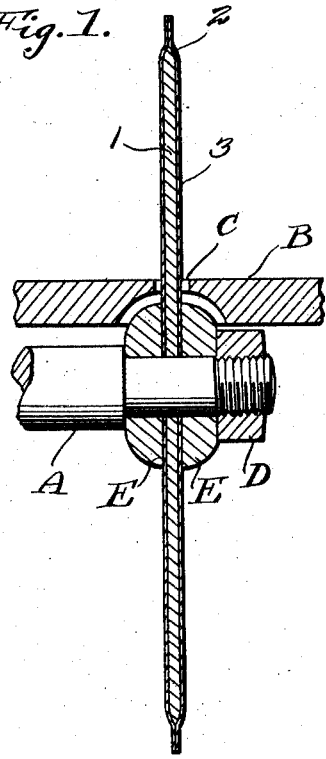
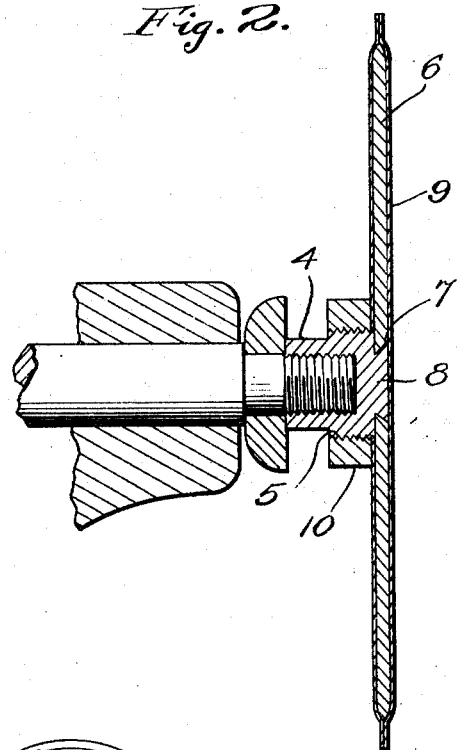
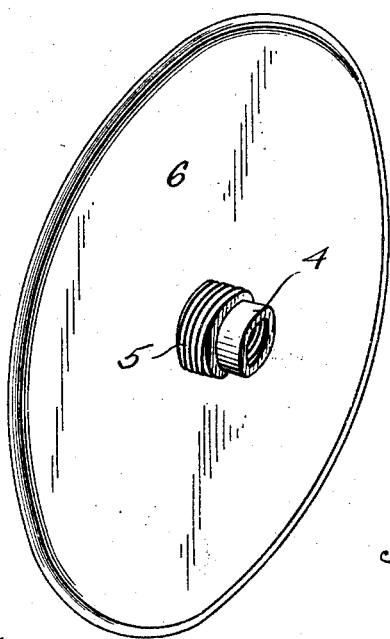
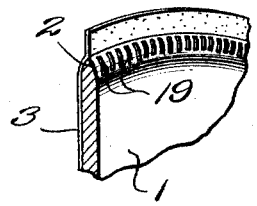
Joseph G. Hudspith
INVENTOR March 26, 1929. J. G. HUDSPITH 1,707,162
ABRADING DEVICE
Filed March 22, 1927 2 Sheets-Sheet 2
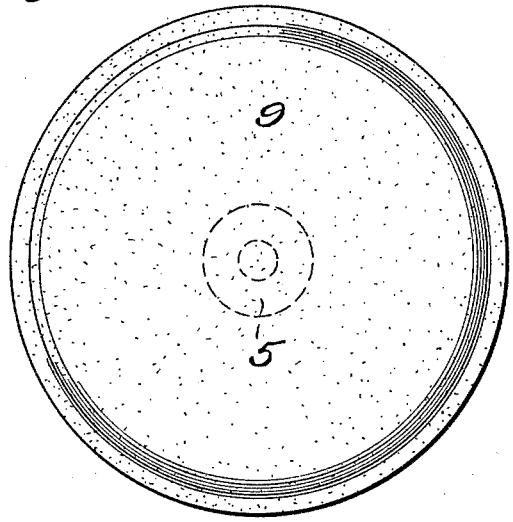
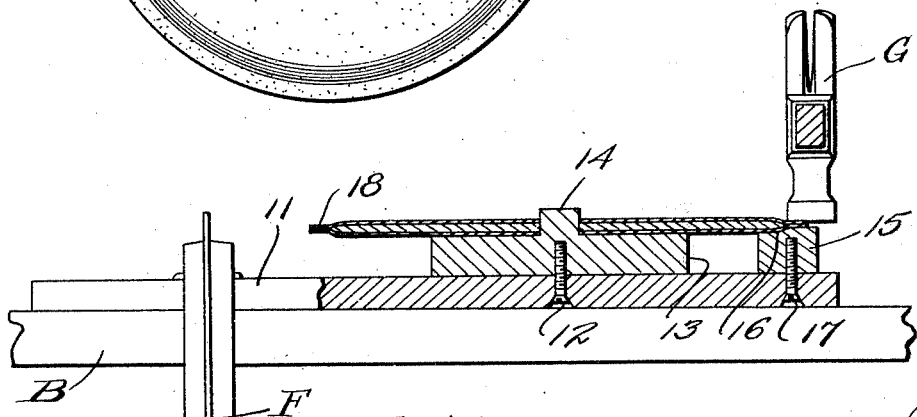
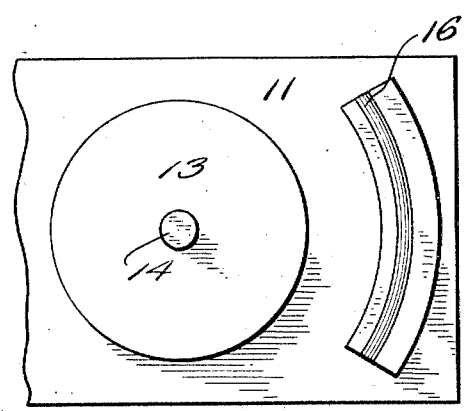
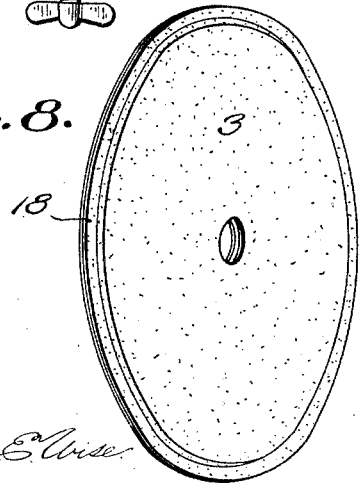
Joseph G. Hudspith
INVENTOR
BY Victor J. Evans
ATTORNEY Patented Mar. 26, 1929.

1,707,162

UNITED STATES PATENT OFFICE.

JOSEPH G. HUDSPITH, OF SAN LUIS OBISPO, CALIFORNIA, ASSIGNOR OF ONE-HALF TO NATHAN S. LEWIS, OF SAN LUIS OBISPO, CALIFORNIA.

ABRADING DEVICE.

Application filed March 22, 1927. Serial No. 177,444.

This invention relates to abrading devices and one of its objects is to provide an abrading device primarily designed for use in wood working and one that is capable of being secured to the arbor or shaft of a circular saw, by merely removing the saw and replacing the same with my abrading device.

A further object of the invention is to provide a novel means for securing an abrading device to a saw arbor, and also to provide an improved method of securing the abrasive material such as sand paper or the like to the disk.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view taken through one form of my novel abrading device and showing the same secured to a saw arbor.

Figure 2 is a similar view of a modified form.

Figure 3 is a perspective view of the form of the disk as shown in Figure 2.

Figure 4 is a fragmentary sectional view of a modified form of disk.

Figure 5 is a front elevation of the form as shown in Figure 2.

Figure 6 is a view partly in section and side elevation of the means for supporting the disk when applying the abrasive material thereto and suggesting my novel method of application.

Figure 7 is a fragmentary top plan view of the disk supporting means.

Figure 8 is a perspective view of the disk as shown in Figure 1.

One form of my invention is illustrated in Figure 1 wherein A indicates the arbor of a circular saw, B the saw table which is provided with a slot C. The arbor A is reduced to provide a threaded spindle as shown which in the present instance receives my abrasive device which includes a flexible metal disk 1 of sufficient stiffness to withstand the pressure of work to be abraded and said disk is provided with beveled outer edges 2 and an opening through which the spindle passes. The disk in this form of the invention is secured to the spindle by the nut D and is centrally arranged on the unthreaded portion by the usual spacing blocks E. The disk 1 in this form of the invention is covered by sand paper or other abrasive material 3 which is secured thereto by adhesive material such as glue and the like, and the novel method of securing the abrasive material to the disk will be presently described. However, it is obvious that by tapering the edges of the disk the abrasive material will readily adhere thereto without fear of cracking or damaging the same. The abrasive material in this form of the invention is provided with openings aligned with the opening in the disk 1 so that the inner portion of the material is disposed between the blocks E which cooperate with the adhesive material for securing the abrasive material to the disk as will be readily apparent. The disk shown in this form of the invention rotates through the slot C and therefore the table B can be used as a guide means for holding work against the abrading material and either side of the disk may be used as will be obvious.

In the modified form of abrading device as shown in Figure 2 I have also illustrated a modified form of saw arbor. In this instance the arbor is also provided with a spindle and a spacing block which surrounds the entire smooth surface of the spindle as shown and which provides a stop for the sleeve 4 which is threadedly secured to the spindle and is provided with a threaded shoulder 5. The disk 6 is identical in construction with the disk 1 with the exception that the disk 6 is formed with a centrally disposed opening having converging side walls 7 and within which is swedged a projection 8 extending from the sleeve 4 and which is formed with similar shaped walls as shown. The projection 8 terminates in alignment with the outer portion of the disk 6 so that the outer sheet of abrasive material 9 will cover the entire outer face of the disk and projection 8 respectively. A nut 10 is threaded to the shoulder 5 and engages the inner portion of the inner sheet of abrasive material which together with the outer sheet is secured to the disk by adhesive material.

In Figures 6 and 7 I have shown the means for supporting the disk when applying the adhesive material thereto and said means includes a base 11 rectangular in formation and which is adapted to be clamped to the saw table B by a clamp F of the screw type. Superimposed upon the base 11 and secured thereto through the medium of a screw 12 is a disk shaped block 13 having rising centrally therefrom a circular stud 14 which is adapted to be passed through the opening formed in the disk which reposes upon the block 13 in the manner as shown in Figure 6 of the drawings. Arranged in proximity to the disk block 13 is an arcuate shaped block 15 formed with a groove 16 arranged its entire length and on its inner surface in a manner to follow the shape of the outer edge of the disk when the abrasive material is applied thereto. The arcuate shape block 15 is secured to the base 11 through the medium of screws 17.

The abrasive material used is preferably sand paper, and is formed in disk formation as shown and provided with adhesive on the unsanded outer edges, and before the same is applied to the disks 1 and 6, the unsanded portion is thoroughly sponged which will also moisten the adhesive, the paper is then applied to the disk which is arranged on the blocks 13 and 15 as shown in Figure 6 and the overlapping ends 18 of the paper are arranged in contacting engagement and thoroughly fixed together through the medium of the adhesive material thereon by pounding the same by a hammer G or other like instrument as suggested. It will be obvious that when the paper or adhesive material dries it will contract and thereby remain taut upon the disk to provide a perfect abrasive surface as will be obvious.

In Figure 4 I have illustrated a slightly modified form of disk and in this form I have provided serrations 19 on the beveled edge of the disk and these serrations will pass through the abrading material and cooperate with the adhesive material for securing the same to the disks, but in both instances it is necessary that the ends of the abrasive material extend beyond the outer edge of the disk and be secured together as best shown in Figures 1, 2, 4 and 6.

From the above description and disclosure in the drawings, it will be obvious that I have provided an abrasive device primarily designed for wood work and due to the fact that the structure is adapted to be secured to the arbor of a circular saw, the necessary speed of the device is obtained, as it is extremely advantageous in wood working to have a high speed in order to produce the best finished work. In the form as shown in Figure 2 the work can be applied to the entire outer surface of the disk covered with the abrasive material, and therefore an extremely large space can be finished at a single operation.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A method of making an abrading device consisting of taking a flexible metallic disk and a pair of sheets of sand paper of disk formation of an area larger than the area of the metallic disk, with adhesive material on the outer edges of the unsanded surfaces of the sheets, sponging the unsanded surfaces of the sheets so as to moisten the same and applying the sheets to the opposite sides of the metallic disk with the sanded surfaces exposed and the adhesive carrying edges projecting beyond the outer edge of the metallic disk, arranging the adhesive edges in contacting engagement and allowing the sheets to dry so that they will contract and be drawn tightly about the metallic disk.

In testimony whereof I affix my signature.

JOSEPH G. HUDSPITH.